Sept. 29, 1970 D. N. JAMES 3,531,587
VIDEO SIGNAL MULTIPLEXER FOR TEST SIGNAL GENERATION
Filed Nov. 15, 1967
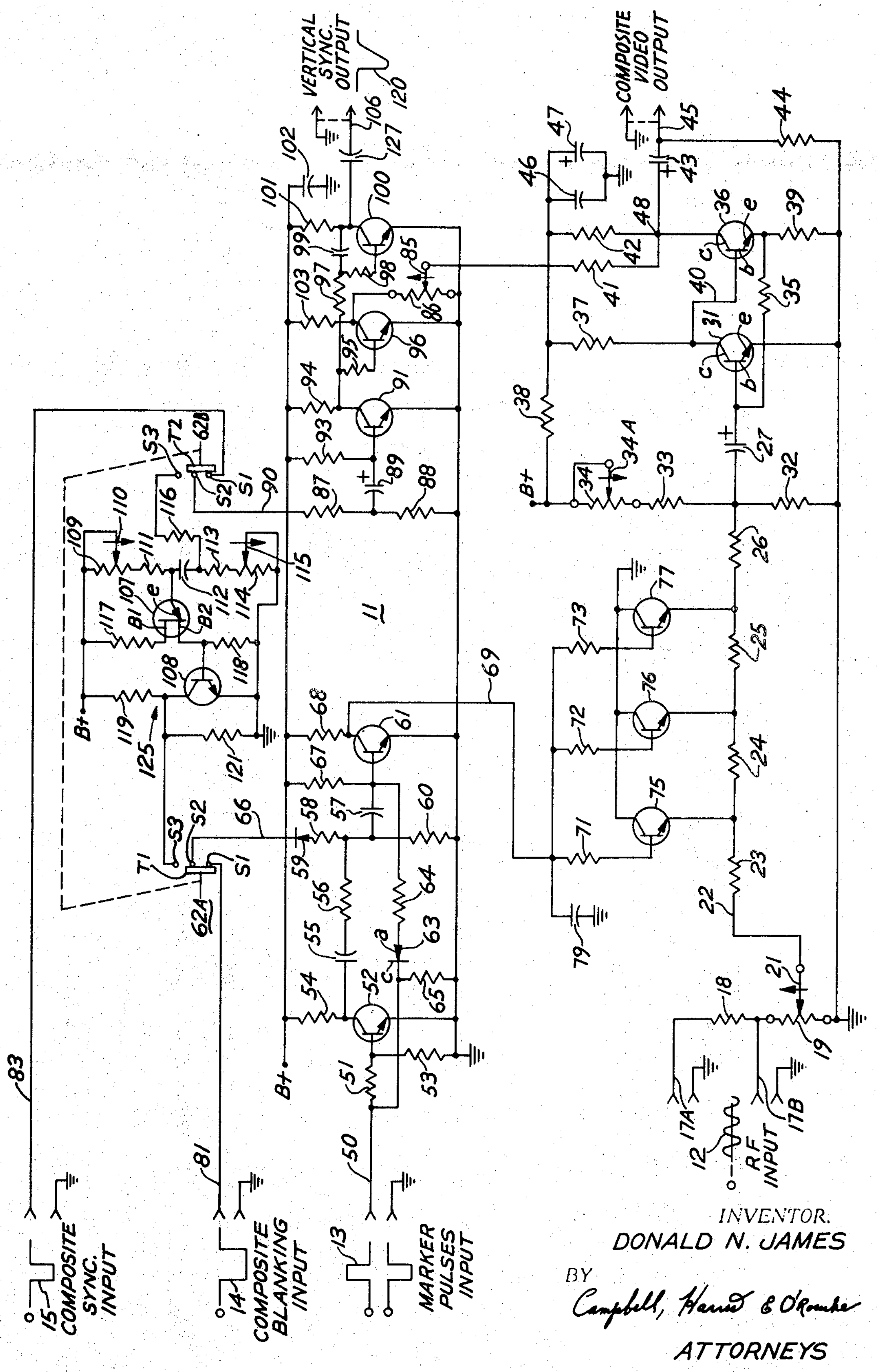
INVENTOR.
DONALD N. JAMES
BY
Campbell, Harris & O'Rourke
ATTORNEYS 3,531,587

VIDEO SIGNAL MULTIPLEXER FOR TEST SIGNAL GENERATION

Donald N. James, Boulder, Colo., assignor to Ball Brothers Research Corporation, Boulder, Colo., a corporation of Colorado Filed Nov. 15, 1967, Ser. No. 683,192
Int. Cl. H03k *5/00, 17/02;* H04n *7/02*
U.S. Cl. 178—6 10 Claims

ABSTRACT OF THE DISCLOSURE

A system is disclosed for providing test signals for television equipment to permit the frequency response of the equipment to be tested without the necessity of disabling the clamp circuits associated therewith.

BACKGROUND OF THE INVENTION

Field of the invention

The latest patents known to applicant of the type of this invention are listed hereinbelow and have been classified in Classes 178—7.1; 331—55; and 324—57.

Description of the prior art

The pertinent prior art known to applicant is as follows: 2,775,335—White, 2,881,388—Behrend, and 2,921,268—Foster et al.

In signal generating systems, as represented by the known prior art, apparatus is disclosed for interspersing pulses at selected points on a sine wave. The prior art patents show television signal generators for providing pulses at selected points of the video signals. Still other prior art patents disclose circuits for interspersing marker pulses in a video signal.

SUMMARY OF THE INVENTION

This invention relates to a system for providing signals for testing the operation of television signal-handling equipment including microwave links, distribution and special processing amplifiers, transmitters and video tape recorders.

To test the frequency response of television studio equipment which contains clamp circuits, it is usually necessary to disable these clamp circuits to accommodate an RF output from the testing oscillator or sweep generator. The clamp disabling process is time-consuming and also allows the equipment to function at a different operating point than when handling composite video. Test results are subject to error due to the operating point shift when the clamp circuits are disabled.

The signal multiplexer of the invention adds sync and blanking signals to an RF signal source which allows equipment to be tested directly with composite video and eliminates the time and errors associated with clamp disabling.

BRIEF DESCRIPTION OF THE DRAWINGS

FIG. 1 is a schematic diagram of one embodiment of the circuit of the invention showing some pertinent waveforms.

DESCRIPTION OF A PREFERRED EMBODIMENT

The inputs to the video signal multiplexer 11 are indicated on the left-hand side of the figure when oriented for reading the drawing.

RF input

An RF (radio frequency) signal input indicated as a sine wave 12 is coupled from, for example, a signal generator not shown through either terminal leads 17A or 17B. Each of the terminal leads has the usual associated grounding lead indicated in the drawing. Note also in the drawing that a grounding lead is shown for all of the input terminal leads 50, 81 and 83 and the output terminal leads 45 and 106.

The signal coupled to terminal 17A is further coupled through a resistor 18 and a portion of a variable resistor or potentiometer 19, and the variable contact arm 21 to the input lead 22. Note, that resistor 18 is connected in series with potentiometer 19 to ground, and terminal 17B is connected to the junction of resistors 18 and potentiometer 19. The RF signal coupled to terminal 17B is thus coupled through the upper portion of potentiometer 19 and contact arm 21 to input lead 22. The contact arm 21 adjusts the signal level.

A signal applied through either terminals 17A or 17B is connected through input lead 22 and series resistors 23, 24, 25 and 26 and series capacitor 27 to the base *b* of a conventional type NPN transistor 31 having a base *b*, an emitter *e* and a collector *c*. A voltage divider series network comprising a potentiometer 34 and resistors 33 and 32 is connected from B+ to ground reference. The junction of resistors 32 and 33 is connected to the junction of resistor 26 and capacitor 27 for purposes to be described.

The emitter *e* of transistor 31 is connected to ground, its collector *c* is connected through resistors 37 and 38 to B+ potential, and its base *b* is connected through a resistor 35 to the emitter *e* of another NPN transistor 36. The output from transistor 31 is coupled from collector *c* through lead 40 to the base *b* of transistor 36.

Note that in the particular embodiment shown, all of the NPN transistors shown in the figure are similar in design and configuration to transistors 31 and 36 and have a commercial designation of 2N3563. In the depiction of each of the NPN transistors in the drawing, the vertical straight line represents the base *b*, the arrowed line represents the emitter *e*, and the third line represents the collector *c*. In order not to clutter up the drawing, the letterings *b*, *e*, and *c* have been omitted from all the NPN transistors except transistors 31 and 36.

The collector *c* of transistor 36 is connected through resistors 42 and 38 to B+ potential, and collector *c* of transistor 36 is also connected through a resistor 41 to the variable contact arm 85 of a potentiometer 86, for purposes to be described hereinafter.

The output from collector *c* of transistor 36 is coupled through a series capacitor 43 and across or in parallel to resistor 44 to lead 45 as a portion of the composite video output, as will also be described.

Transistors 31 and 36 function as a non-inverting feedback amplifier pair as is well-known in the art. Thus, if only an RF input signal 12 is coupled to the multiplexer circuit 11 via terminals 17A and 17B, the signal output from transistor 36 will be an amplified output reproduction of the input signal.

Marker pulse input

A marker pulse input is provided so that frequency markers from an associated sweep generator will be converted to absorption markers at the composite video output. The term "absorption marker" usually implies that the RF signal is reduced to zero during the marker period. If the system being tested has a bandpass characteristic such that the output falls to zero at 10 mc., then an absorption marker at 10 mc. could not be seen. The absorption markers provided by the multiplexer 11 are easily recognized even at points of zero system response because these markers absorb to blanking level, causing a narrow notch in the oscilloscope presentation of the system response. The advantages of this type of marker are most readily appreciated when testing a video tape recorder. These markers cannot cause overmodulation and also become a part of the recording and can be identified during playback at a later time.

The marker pulse input 13 can be either of a positive or negative polarity obtained from any suitable known source.

A positive marker pulse input 13 is coupled through lead 50 and resistor 51 to the base of NPN transistor 52. The base of transistor 52 is connected through resistor 53 to ground, its emitter is connected directly to ground and its collector is connected through resistor 54 to B+ potential. The output from the collector of transistor 52 is coupled through series network consisting of capacitor 55, resistor 56, and capacitor 57 to the base of transistor 61. Transistor 52 is biased to be normally non-conducting, and transistor 61 is biased to be normally conducting. A positive input coupled through lead 50 and resistor 51 to the base of transistor 52 causes transistor 52 to conduct and provide a low, essentially ground, potential signal from its collector to the base of transistor 61 to cut-off transistor 61.

The input lead 50 is also connected through the diode 63 and resistor 64 to the base of transistor 61; and through resistor 65 to ground reference. Diode 63 is connected to have its cathode *c* connected to lead 50 and its anode *a* connected through resistor 64 to the base of transistor 61 to thus permit a marker pulse of negative polarity to be coupled to the base of transistor 61.

The emitter of transistor 61 is connected to ground, its base is connected through resistor 67 to B+ potential, and its collector is connected through resistor 68 to B+ potential, and, as mentioned, transistor 61 is biased to be normally conducting. The output from the collector of transistor 61 is coupled through lead 69 in common through respective resistors 71, 72 and 73 to the bases of respective transistors 75, 76 and 77. A D.C. filter capacitor 79 is connected to the common junction of resistors 71, 72 and 73. The collectors of transistors 75, 76 and 77 are connected in common to ground potential. The emitter of transistor 75 is connected to the junction of resistors 23 and 24, the emitter of transistor 76 is connected to the junction of resistors 24 and 25; and, the emitter of transistor 77 is connected to the junction of resistors 25 and 26.

As mentioned above, either a positive or negative marker pulse 13 coupled to the circuit will cause transistor 61 to be cut off. When transistor 61 is cut off, a relatively high potential signal is provided through lead 69 and resistors 71, 72 and 73 to the bases of transistors 75, 76 and 77 to turn ON transistors 75, 76 and 77. Accordingly, the potential at the emitters of transistors 75, 76 and 77 drops to essentially ground potential and the RF signal 12 appearing on lead 22 will be grounded and no signal or a zero level signal will appear at the base *b* of transistor 31. Thus, during the period that either a positive or negative marker pulse 13 is applied to the circuit, the transistors 75, 76 and 77 are turned "on" and the output from the non-inverting amplifier comprising transistors 31 and 36 will be a zero output.

Note that transistors 75, 76 and 77 are used in the inverted connection with their collectors grounded. While circuit configuration provides slightly better performance as a switch than if the emitters were grounded, it is not absolutely necessary for proper circuit operation.

Thus, transistors 75, 76 and 77 comprise a three-stage attenuator when in the "on" condition, with the three transistors 75, 76 and 77 being turned on to saturation by the marker signal 13, or, as will be explained, by the composite blanking input pulse 14.

Composite blanking input

A composite blanking input pulse 14 of negative polarity is applied from any suitable known source through lead 81 and switch 62A to the multiplexer 11. The blanking pulse is effective to blank portions of the input signal in accordance with the width and timing of the input blanking signal, as will be explained. Composite blanking input 14 is coupled through lead 81, terminals S1 and S2 of switch 62A, lead 66, diode 59, resistor 58 and capacitor 57 to the base of transistor 61, causing transistor 61 to be turned off. As mentioned above, when transistor 61 turns off, a high potential signal is coupled to the three attenuator transistors 75, 76 and 77.

Composite sync input

The negative composite sync input pulse 15 is coupled through lead 83, terminals S1 and S2 of switch 62B, lead 90, resistor 87 and capacitor 89 to the base of a transistor 91. Transistor 91 has its emitter connected to ground, its base connected through resistor 93 to B+ potential and its collector is connected through resistor 94 to B+ potential. The junction of resistor 87 and capacitor 89 is connected to ground. The output from the collector of transistor 91 is coupled through resistor 95 to the base of a transistor 96. The emitter of transistor 96 is connected to ground and its collector is connected through resistor 103 to B+ potential. The output from the collector of transistor 91 is also coupled through series resistors 97 and 98 to the base of transistor 100. The emitter of transistor 100 is connected to ground and its collector is connected through resistor 101 to B+ potential. A capacitor 102 is connected from ground to B+ potential to provide A.C. filtering for the B+ potential source.

The output from the collector of transistor 96 is coupled through a portion of potentiometer 86, its contact arm 85 and resistor 41 to the junction labeled 48 for purposes to be explained.

Transistor 91 is normally conducting and the composite sync signal 15 causes transistor 91 to cut off and provide a high-potential signal at its collector which is coupled through resistor 97 and resistor 98 to the base of normally non-conducting transistor 100 to turn ON transistor 100.

When transistor 100 turns ON the output from its collector is coupled through a capacitor 127, an output lead 106 to provide a negative-going vertical sync output signal 120. A vertical sync output 120 provides a sync pulse output to synchronize the start time of an associated sweep generator with the vertical interval period.

Internal oscillator

With switches 62A and 62B in the position shown, a composite blanking input 14 and a composite sync input 15 is applied to the multiplexer 11 from external sources. However, if it is found desirable to provide a blanking input and a sync input from an internal source, the oscillator circuit generally labeled 125 and including a transistor 108, a unijunction transistor 107 and a voltage dividing network may be utilized as is well-known and will now be explained.

Note that switch 62A is mechanically ganged to switch 62B such that switch blade T1 of switch 62A and blade T2 of switch 62B move concurrently, as indicated by the dotted lines in the figure. Switches 62A and 62B each have three contacts S1, S2 and S3, and the respective switch blade T1 which when in a first position is arranged to provide an electrical connection between S1 and S2; and, when moved to a second position provides an electrical contact between switch points S2 and S3.

When it is desired to utilize the internal oscillator 125, the switch blade T1, switches 62A and 62B are moved to bridge or contact terminals S3 and S2.

A voltage dividing network comprising series connected potentiometer 109, resistor 111, capacitor 112, resistor 113 and potentiometer 114 is connected between the B+ potential and ground reference. As is known, respective variable arms 110 and 115 of potentiometers 109 and 114 provide voltage adjustment for the voltage dividing network.

The unijunction transistor 107 is of a type well-known in the art and includes an emitter *e*, a first base B1 and a second base B2. The junction of capacitor 112 and resistor 111 is connected to the emitter *e* of unijunction transistor 107. The junction of capacitor 112 and resistor 113 is connected through resistor 116 to terminal point S3 of switch 62B for purposes to be described.

The base B1 of unijunction transistor 107 is connected through resistor 117 to B+ and its base B2 is connected through resistor 118 to ground potential. The output from base B2 of unijunction transistor 107 is connected to the base of an NPN transistor 108. The emitter of transistor 108 is connected to ground, its collector is connected though resistor 119 to B+ potential, and also connected through a resistor 121 to ground reference. The output from the collector of transistor 108 is coupled to the terminal point S3 of switch 62A for purposes to be described.

The operation of the oscillator circuit 125, now to be briefly explained, is well-known in the art. When operation of the circuit 125 is initiated the B+ potential will charge the capacitor 112 through the resistor 111, potentiometer 109 and variable arm 110 toward B+ potential. When the potential at the emitter *e* of unijunction transistor 107 reaches a voltage which is a given percentage of the voltage differential between the bases B1 and B2, transistor 107 will fire. When transistor 107 fires, capacitor 112 is discharged through the circuit which may be traced from the upper plate of capacitor 112, emitter *e* of unijunction transistor 107, base B2, resistor 118, variable arm 115 of potentiometer 114, the upper portion of potentiometer 114, resistor 113 and the lower plate of capacitor 112. Thus, when unijunction transistor 107 fires, a positive potential will be applied to the base of transistor 108 causing transistor 108 to fire and provide a negative signal at its collector which is coupled through terminal points S3 and S2 of switch 62A, lead 66, diode 59, resistor 58 and capacitor 57 to the base of transistor 61 causing transistor 61 to be cut off. As described above, when transistor 61 is cut off, a positive signal is provided through lead 69 to attenuating transistors 75, 76 and 77 to cause the latter transistors to turn ON. When capacitor 112 discharges the unijunction transistor 107 will turn off, causing transistor 108 to also turn off.

Also, when capacitor 112 discharges, a negative signal is applied through resistor 116 and terminal points S3 and S2 of switch 62B, lead 90, resistor 87 and capacitor 89 to the base of transistor 91 causing transistor 91 to be cut off.

As described above, when transistor 91 is cut off, a positive signal is provided to the base of transistor 96 and also to the base of transistor 100 causing the latter transistors to turn ON. Accordingly, transistor 96 will then provide a negative signal from its collector through the upper portion of potentiometer 86, variable arm 85 and resistor 41 to the junction point 48. At junction point 48 the signal from transistor 96 is combined with the signal from transistor 36 to provide a summed or combined signal through capacitor 43 and lead 45 as a composite video output. Also, transistor 100 will provide a negative signal through capacitor 127 and lead 106 as the negative vertical sync output 120.

Operation

The voltage divider consisting of potentiometer 34, resistor 33 and resistor 32 establishes a slightly positive voltage at the emitters of transistors 75, 76 and 77. The input RF signal 12 swings symmetrically plus and minus about this potential until the blanking signal 14 occurs. When the blanking signal 14 occurs, the RF signal 12 and the control voltage established by the first-mentioned voltage divider are both clamped to ground by means of the three saturated transistors 75, 76 and 77. Since the control voltage is variable via variable contact arm 34A, but is always clamped to ground during the blanking interval, it has the effect of raising or lowering the height of the average RF signal 12 provided by the signal generator. The marker pulses 13 also clamp the signal to ground so that the marker pulses are visible even when no signal is present at the RF input. The signal resulting from interspersing the blanking input 14, the marker pulses 13 in the RF signal is amplified by the non-inverting feedback amplifier consisting of transistors 31 and 36.

The composite sync input 15 is amplified by transistors 91 and 96; and, a portion of the amplified sync signal is coupled through potentiometer 86 to junction 48. Composite sync input 15 is thus added to the RF signal 12 at junction 48 by current summing in the collector resistor 42 of transistor 36. When both the composite blanking signals and the composite sync signals are applied to the multpilexer 11 and combined, the resultant signal is then called composite video which is coupled as an output via the capacitor 43.

As mentioned above, the sync input 15 and blanking input 14 can be internally generated by oscillator 125, the operation of which has been explained above.

While the invention has been particularly shown and described with reference to a preferred embodiment thereof, it will be understood by those skilled in the art that various changes in form and details may be made therein without departing from the spirit and scope of the invention.

I claim:

1. Circuitry for testing television signal equipment and interspersing pulses in a signal comprising, in combination,
- means for coupling a first alternating current signal to said circuitry,
- means for providing a variable control potential whereby said first signal varies about said potential;
- means for coupling marker and blanking pulses to said circuitry to be operatively combined with said first signal and method;
- means for clamping said control potential to a given reference in response to said marker and blanking pulses whereby said blanking and marker pulses are interspersed in said first signal and are detectable even when said first signal is not present.

2. Circuitry as in claim 1 further including,
- means for combining synchronizing pulses with said first signal, said blanking and marker pulses whereby the output is a signal representative of a composite video output.

3. Circuitry as in claim 1 wherein said clamping means includes,
- transistor attenuator means connected to receive said marker and blanking pulses and to become conductive in response to said marker and blanking pulses;
- means connecting said transistors in the circuit path of said first signal; and
- means connecting said transistors to ground reference whereby when said transistors become conductive said first signal is grounded.

4. Circuitry as in claim 3 further including,
- means for enabling marker pulses of positive and negative polarity to actuate said transistor attenuator means;
- said enabling means comprising first and second transistors connected in series with said second transistor being connected to said transistor attenuator means;
- means for coupling positive marker pulses to said first transistor; and
- means for bypassing said first transistor and coupling negative marker pulses to said second transistor.

5. Circuitry as in claim 1 further including,
- oscillator means for selectively and internally generating blanking and synchronizing pulses;
- said oscillator means comprising a unijunction transistor, an NPN-type transistor, and a voltage divider network;

said network including capacitive and resistive means operatively connected in series across an associated source of potential;

said capacitive means being connected to said unijunction transistor whereby said unijunction transistor fires when said capacitor charges to a preselected level;

said unijunction transistor being coupled to provide an output to said NPN transistor to provide blanking pulses; and said capacitor also providing synchronizing pulses during its discharging cycle.

6. Circuitry as in claim 5 wherein switch means are provided for selectively coupling to said oscillator means.

7. Circuitry as in claim 4 wherein, said reference potential means comprises resistive means connected to said attenuator transistors as a voltage dividing network.

8. Circuitry as in claim 1 further including, voltage control means for combining said first signal, the marker pulses, the blanking pulses and the synchronizing pulses to provide a resultant signal representative of a composite video output.

9. Circuit apparatus for providing test signals for television equipment to permit the frequency response of such equipment to be tested without the necessity of disabling the clamping associated therewith comprising, in combination:

means for coupling a first signal to a selected signal path in said circuit;

attenuator means for said first signal;

said attenuator means comprising at least one transistor having three electrodes, one of which electrodes receiving the blanking and marker signals, a second of said electrodes being connected to selected reference;

means for coupling blanking and marker pulses to said attenuator means;

said blanking pulses and marker pulses causing said attenuator transistor to become conductive and thereby attenuate said first signal;

means for connecting a voltage divider network in said first signal path for adjusting said first signal level to a given direct current level whereby said marker pulses and blanking input pulses will be detactable even in the absence of said first signal;

means for coupling said composite sync input pulses to said circuit;

means for receiving said composite sync input pulses and providing a vertical sync output; and means for combining a portion of said composite sync signal with the signal resulting from said first signal, said blanking pulses and said marker pulses to provide a composite video output.

10. Circuitry for testing television signal equipment and interspersing preselected pulses in a signal, comprising:

means adapted to receive an alternating current signal;

means for providing a control potential whereby said alternating current signal varies about said potential;

means adapted to receive preselected pulses to be operatively combined with said alternating current signal; and means for clamping said control potential to a predetermined reference in response to said preselected pulses whereby said pulses are interspersed in said alternating current signal and are detectable even when said alternating current signal is not present.

References Cited

UNITED STATES PATENTS

| | | | |
|---|---|---|---|
| 2,733,433 | 1/1956 | Morrison | 331—144 |
| 2,763,833 | 9/1956 | Brumbaugh | 178—6 |
| 2,885,470 | 5/1959 | Bartelink | 178—6 |

RICHARD MURRAY, Primary Examiner

HOWARD W. BRITTON, Assistant Examiner

U.S. Cl. X.R.

324—88; 331—144